United States Patent [19]

Tsuji et al.

[11] Patent Number: 5,048,000
[45] Date of Patent: Sep. 10, 1991

[54] OPTICAL INFORMATION READING APPARATUS COMPRISING A DIFFRACTION GRATING MEMBER HAVING FIRST AND SECOND PORTIONS

[75] Inventors: Shigeki Tsuji; Hikaru Nishihara, both of Hiroshima, Japan

[73] Assignee: Sharp Kabushiki Kaisha, Osaka, Japan

[21] Appl. No.: 334,563

[22] Filed: Apr. 7, 1989

[30] Foreign Application Priority Data

Apr. 7, 1988 [JP] Japan .................................. 63-86707

[51] Int. Cl.⁵ .......................... G01J 1/20; G11B 7/00
[52] U.S. Cl. .................................. 369/44.12; 369/112; 369/109; 369/100; 250/205.1; 350/116.17; 356/124
[58] Field of Search ................... 369/44.12, 44.23, 109, 369/110, 103, 112, 120; 350/162.17, 162.2, 162.23; 356/124; 250/237 G, 201.5

[56] References Cited

U.S. PATENT DOCUMENTS 3,913,076 10/1975 Lehureau et al. .
4,733,065 3/1988 Hoshi et al. .

FOREIGN PATENT DOCUMENTS 0228620 7/1987 European Pat. Off. .
0305169 3/1989 European Pat. Off. .

Primary Examiner—Roy N. Envall, Jr.
Assistant Examiner—Thang V. Tran

[57] ABSTRACT

An optical information reading apparatus for reading recorded information by detecting the presence or absence of pits on an optical disk using a laser beam. The laser beam converged a lens irradiates the optical disk in the form of light spots when in the in-focus state. A dividing line of a holographic grating used for detecting offset of the lens from the in-focus state and a dividing line of a photosensitive detector receiving a light diffracted by the holographic grating are adapted to as to be parallel to a radial direction of the optical disk. Therefore, when a light spot formed on the optical disk by astigmatism of the lens assumes an elliptical shape, the light spot becomes an ellipse whose long axis extends to the direction of the dividing line of the photosensitive detector, so that no error signal is generated in the in-focus state.

3 Claims, 8 Drawing Sheets

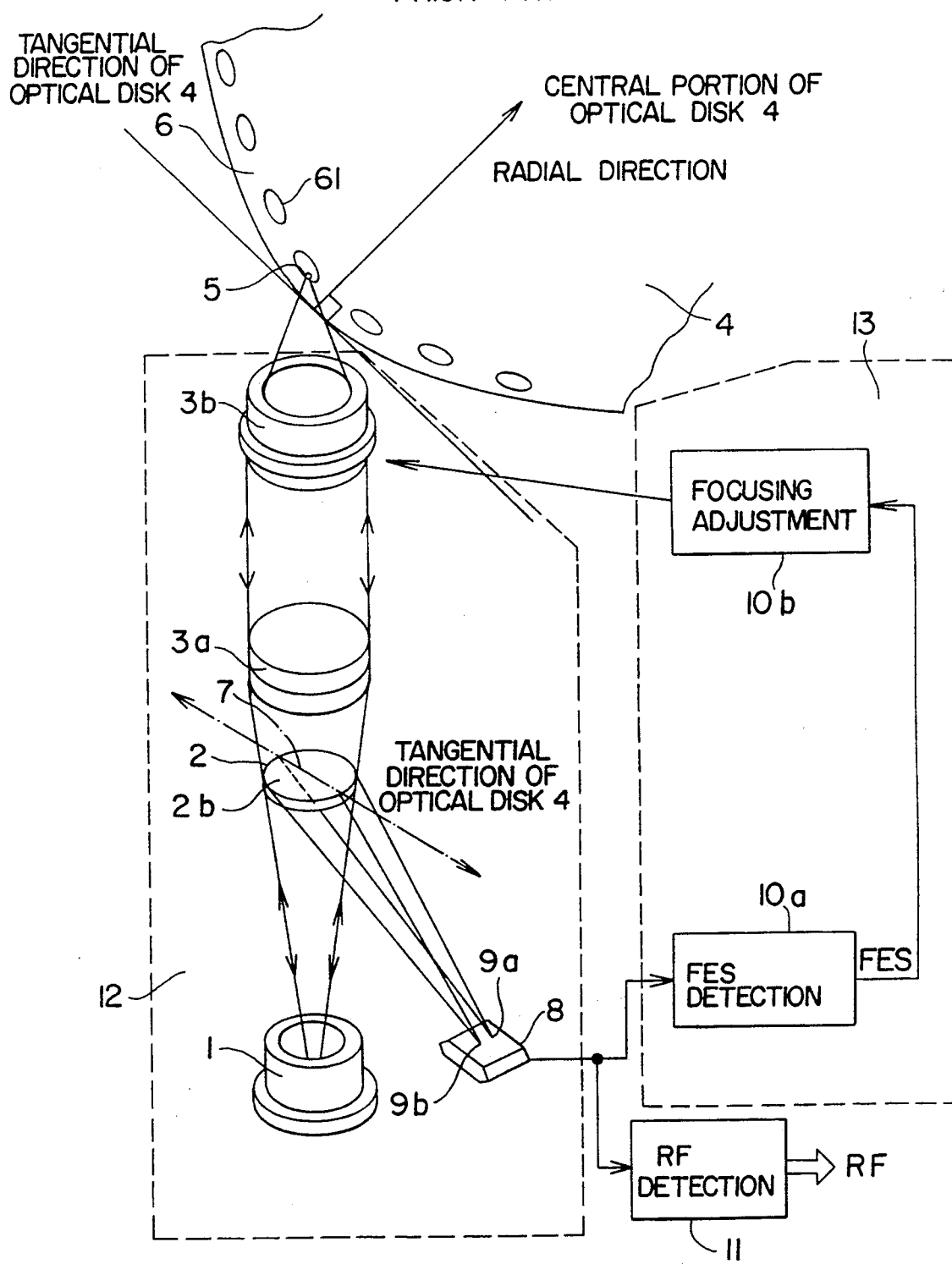

CIRCUMFERENTIAL
DIRECTION OF
OPTICAL DISK 4

TANGENTIAL
DIRECTION OF
OPTICAL DISK 4

OPTICAL INFORMATION READING APPARATUS COMPRISING A DIFFRACTION GRATING MEMBER HAVING FIRST AND SECOND PORTIONS

BACKGROUND OF THE INVENTION

1. Field of the Invention

The present invention relates generally to optical information reading apparatus for reading from an optical disk such as a compact disk or a laser disk with information recorded thereon, and more particularly, to an optical information reading apparatus employing the wedge prism method in a focusing servo.

2. Description of the Background Art

On the surface of an optical disk such as a compact disk and a laser disk, small hollows referred to as pits are spirally arranged from the central portion of the disk to the peripheral portion thereof. All pits have the same width. However, the length of each of the pits and an interval between pits respectively differ depending on the recorded information. The surface of the disk is covered with a reflecting film formed by, for example, evaporation of aluminum. When the surface of this disk is irradiated by light, light incident on the pits is absorbed while light incident on a surface having no pits is reflected. In an optical information reading apparatus utilizing such a principle, a laser beam is first converged by a lens so that light spots are formed and the, the formed light spots are irradiated along a pit train on the surface of the optical disk while rotating the optical disk, whereby the presence or absence of pits is detected by detecting the presence or absence of reflected light. More specifically, information recorded on the optical disk can be read.

FIG. 1 is a schematic diagram showing a structure of a conventional optical information reading apparatus using a holographic grating. This apparatus employs the wedge prism method in a focusing servo for irradiating light spots having the same shape which are always in the in-focus state on an optical disk.

Prior to the description of FIG. 1, the principle of the wedge prism method will be briefly described. The wedge prism method basically employs a wedge prism 200 assuming the shape of a V-shaped valley in a cross section as shown in FIG. 2A. Referring to FIG. 2B, a beam of light is divided into two sections in the central portion of the wedge prism 200. Each of the beams of light divided by the prism 200 forms a dot-shaped light spot in an in-focus position F while forming a semicircular spot in positions X and Y before and after the in-focus position F. Referring to FIG. 2B, the light spot formed from each of the divided beams (of light) assumes a semicircular shape expanded outward in the position X before the in-focus position F while assuming a semicircular shape expanded inward in the position Y after the in-focus position F. According to the wedge prism method, such a change in shape of the light spot caused by offset from the in-focus position is detected as a change in electrical signal so that a focus error signal is obtained.

In the apparatus shown in FIG. 1, a holographic grating 2 is used instead of the wedge prism. FIG. 3 is an enlarged view of the holographic grating 2.

Referring to FIG., 3, the holographic grating 2 has curved grooves which are diffraction gratings on a glass or plastic plate member so as to branch a part of a beam of incident light. The holographic grating 2 is divided into two regions 2a and 2b by a dividing line 7. Regions of and pitches between the grooves respectively formed in the two regions 2a and 2b respectively differ from each other. Therefore, the angles of diffraction of beams of light respectively incident on the regions 2a and 2b differ from each other, so that first-order diffracted beams are converged in different positions. More specifically, since two diffraction gratings having different shapes are formed in the holographic grating 2, the holographic grating 2 has a function of branching the beam of light into two, i.e., the same function as that of the wedge prism.

Referring to FIG. 1, the optical information reading apparatus comprises an optical disk 4, an optical system 12 for reading information on the disk 4, an RF detecting portion 11 for detecting from an output of the optical system 12 an RF (Radio Frequency) signal representing information recorded on the disk 4, and a servo system 13 for controlling the optical system 12 in response to the output of the optical system 12. The optical system 12 comprises a source of laser light 1, a holographic grating 2 which is a diffraction grating element, a collimating lens 3a for turning incident light into parallel light, an objective lens 3b for forming light spots by a laser beam on the disk 4, and a photosensitive detector 8 for receiving diffracted light from the holographic grating 2 to convert the same into an electrical signal.

In FIG. 1, a laser beam emitted from the source of laser 1 is incident on the holographic grating 2. A zero-order diffracted beam out of beams of light incident on the holographic grating 2 is directed to the collimating lens 3a. In this case, there also exists a first-order diffracted beam. However, the angle of diffraction thereof is large so that the first-order diffracted beam does not reach the collimating lens 3a. The collimating lens 3a turns the incident zero-order diffracted beam into parallel light and directs the same to the objective lens 3b. The light incident on the objective lens 3b is converged, to form light spots 5 on the surface of the optical disk 4. A pit train 6 representing recorded information is formed on the surface of the optical disk 4 in a circumferential direction of the optical disk 4. The light (light spot 5) incident on the optical disk 4 is absorbed on the surface of the optical disk 4 when the light spots 5 are formed on pits 61 (constituting the pit train 6) while being reflected when the light spots 5 are not formed on the pits 61. This reflected light is incident on the holographic grating 2 again through the same optical path. On this occasion, the holographic grating 2 comprises two regions 2a and 2b divided by a dividing line 7 (although the dividing line exists in the drawing to show the boundary, no such line actually exists) parallel to an tangential direction of the optical disk 4. Thus, first-order diffracted beams of light incident on the regions 2a and 2b respective form light spots 9a and 9b on the photosensitive detector 8. More specifically, the first-order diffracted beam of light incident on the region 2a of the holographic grating 2 out of the light reflected from the optical disk 4 is converged to form the light spot 9a. Similarly, the first-order diffracted beam of light incident on the region 2b forms the light spot 9b on a light receiving surface of the photosensitive detector 8. The zero-order diffracted beam from the holographic grating 2 is returned to the source of laser. The photosensitive detector 8 outputs electrical signals proportional to the intensity of light of the light spots 9a and 9b. Thus, if an output of the photosensitive detector 8 is detected, the presence or absence of pits on the optical disk 4 can be detected.

Description is now made of a structure of the photosensitive detector 8. FIG. 4 is an enlarged view of the photosensitive detector 8. Referring to FIG. 4, the photosensitive detector 8 comprises photosensitive detectors 81 to 84 divided by dividing lines 14a, 14b and 14c parallel to a tangential direction of the optical disk 4. Thus, if outputs of the photosensitive detectors 81 to 84 are added, an RF signal corresponding to information recorded on the optical disk 4 is detected.

Turning to FIG. 1, the RF signal detecting portion 11 electrically adds output signals of the photosensitive detectors 81 to 84 to provide an RF signal.

Then, the servo system 13 in this optical information reading apparatus comprises an FES detecting portion 10a for outputting a focus error signal (referred to as FES hereinafter) in response to an output of the optical system 12 and a focusing adjustment driving portion 10b for driving a focusing adjusting mechanism in response to an output of the FED detecting portion 10a. In this apparatus, the above described wedge prism method is employed. Thus, light spots having different shapes depending on the in-focus state or the out-of-focus state are formed on the photosensitive detector 8, as described above. FIG. 5A illustrates a state in which images of light spots 9a and 9b are formed in a photosensitive detector 8 when the distance between the optical system 12 and the optical disk 4 is a predetermined distance, i.e., if the distance between the objective lens 3b and the optical disk 4 is a predetermined distance (in the in-focus state). In the in-focus state, images of first-order diffracted beams from the two regions 2a and 2b of the holographic grating 2 are respectively formed in the form of spots 9a and 9b between photosensitive detectors 83 and 84 and between photosensitive detectors 81 and 82 in the photosensitive detector 8. If the distance between the optical system 12 and the optical disk 4 is shorter than a predetermined distance, the light spots 9a and 9b formed on a light receiving surface of the photosensitive detector 8 have shapes as shown in FIG. 5B. The positions of the images are formed offset to the side of the photosensitive detectors 84 with respect to a dividing line 14a for dividing the photosensitive detectors 83 and 84 and to the side of the photosensitive detector 81 with respect to a dividing line 14b for dividing the photosensitive detectors 81 and 82. FIG. 5C illustrates a state in which images of light sports 9a and 9b are formed when the distance between the optical system 12 and the optical disk 4 is longer than a predetermined distance. The light spots 9a and 9b are respectively formed in positions offset to the side of photosensitive detectors 83 and 82 with respect to dividing lines 11a and 11b. The formed light spots respectively assume inverted semicircular shapes expanded to the side of the photosensitive detectors 83 and 82.

Thus, the FES is obtained by detecting the difference between the sum of outputs of the photosensitive detectors 81 and 84 and the sum of outputs of photosensitive detector 82 and 83.

FIG. 6 is a diagram showing one example of a method of forming an FES in the FES detecting portion 10a shown in FIG. 1. Referring to FIGS. 1 and 6, the FES detecting portion 10a comprises a differential amplifier 100 for amplifying the difference between the sum of outputs from both photosensitive detectors 81 and 94 and the sum of outputs from both photosensitive detectors 82 and 83 to output the same as an FES. The focusing adjustment driving portion 10b displaces the distance between the optical system 12 and the optical disk 4 in response to the FES of the FES detecting portion 10a. Thus, if the difference between the sum of the outputs of the photosensitive detectors 81 and 84 and the sum of the outputs of the photosensitive detectors 82 and 83 is zero, i.e., in the in-focus state, the FES is not outputted so that the focusing adjustment driving portion 10b does not displace the optical system 12.

In the above described conventional optical information reading apparatus, the objective lens 3b is made of materials such as glass and plastic. However, it is preferable that the objective lens 3b is made of plastic material in terms of ease of manufacture, cost and quantity production. However, when the objective lens 3b is made of plastic, astigmatism is developed in the objective lens 3b depending on errors and the change in temperature in forming the objective lens 3b. In such a case, light spots 5 formed on the optical disk 4 are elliptical in shape. In this case, a state in which the objective lens 3 is arranged is adjusted such that the direction of the long axis of the elliptical light spots 5 is at right angles to a track provided with a pit train 6, i.e., a circumferential direction of the optical disk 4, thereby to make steep the change in output of the photosensitive detector 8 depending on the presence or absence of pits. FIG. 7A is a diagram showing the positional relation between pits 61 and a spot 5 in the above described case. FIG. 7B is a diagram showing a state in which images of spots 9a and 9b are formed when the distance between the optical system 12 and the optical disk 4 becomes a predetermined distance, i.e., in the in-focus state, if an elliptical spot 5 is formed on the surface of the optical disk 4. Since light reflected from the optical disk 4 to be incident on a holographic grating becomes a beam of light assuming an elliptical shape in cross section, a light spot 9a offset to the side of a photosensitive detector 84 (or offset on the side of a photosensitive detector 83) with respect to a dividing line 14a and a light spot 9b offset on the side of the photosensitive detector 84 (or offset on the side of a photosensitive detector 82) with respect to a dividing line 11b are formed on a light receiving surface of a photosensitive detector 8. In such a state, the difference between the sum of outputs of the photosensitive detectors 81 and 84 and the sum of outputs of the photosensitive detectors 82 and 83 is not zero, so that a focus error signal is provided irrespective of the in-focus state. Consequently, the focusing adjustment driving portion 10b displaces the optical system 12 so as to move nearer to or move further away from the optical disk 4. Therefore, the distance between the object lens 3b and the optical disk 4 becomes shorter or longer than a predetermined distance in the in-focus state. Consequently, no good spots are formed on the optical disk 4 so that no goof RF signal can be obtained. As a result, information recorded on the optical disk 4 cannot be precisely read.

In order to avoid erroneous output of the focus error signal as described above, it is necessary to make a positional adjustment of the objective lens 3b and the holographic grating 2 in combination such that the light sports 9a and 9b formed of first-order diffracted beams from the holographic grating 2 are respectively located between the photosensitive detectors 83 and 84 and between the photosensitive detectors 81 and 82 in the in-focus state when the objective lens 3 having an astigmatism is used. However, in order to possibly make such a positional adjustment, the structure of the optical system must be complicated. As a result, when the above described positional adjustment is made, the structure of the entire apparatus is complicated. In addition, since the astigmatism of the objective lens 3b is changed depending on the change in temperature, the shapes of the light spots formed on the disk 4 are not constant. Thus, the above described positional adjustment is not necessarily made effectively, so that it is difficult to improve the reliability of the apparatus.

SUMMARY OF THE INVENTION

An object of the present invention is to provide an optical information reading apparatus capable of always satisfactorily holding a state in which light from a light source is converged on a rotating recording media.

Another object of the present invention is to provide an optical information reading apparatus capable of precisely reading recorded information from a rotating recording media.

Still another object of the present invention is to provide an optical information reading apparatus capable of always satisfactorily holding a state in which light from a light source is converged on a rotating recording media even if an astigmatic objective lens is used and capable of precisely reading recorded information from the rotating recording media.

A further object of the present invention is to make it possible to always satisfactorily hold a state in which light from a light source is converged on a rotating recording media and to precisely read recorded information from the rotating recording media.

According to the present invention, the converged state of light from a light source on the surface of a rotating recording media can be always satisfactorily held using a simple structure. Thus, information can be always precisely read from the rotating recording media. In addition, an optical lens for converging light from a light source on a rotating recording media need not necessarily comprises a high-precision optical lens having no astigmatism. Thus, the above described optical lens may comprise a lens made of low cost plastic or the like, which is favorable in reducing costs of manufacturing the apparatus.

The optical information reading apparatus according to the present invention comprises a light source for irradiating a laser beam onto a rotating recording media provided with a pit train having a long axis along a circumferential direction, optical means for converging the light from a light source onto the rotating recording media, a diffraction grating member for emitting light converged in at least two directions upon receipt of reflected light irradiated by the rotating recording media, and detecting means including at least two pairs of photosensitive detectors respectively receiving the light irradiated from a diffraction grating member in at least two directions. A photosensitive detector of each of the two pairs of photosensitive detectors having a dividing line formed along the direction of the light emitted from the diffraction grating member. The direction in which the diffraction grating member faces the photosensitive detectors in the detecting means is positioned in a direction parallel to the radial direction of the rotating recording media.

In accordance with a preferred embodiment of the present invention, the diffraction grating member is a holographic grating including divided first and second portions, a boundary line of the first and second portions being parallel to a radial direction of the rotating recording media.

In accordance with another preferred embodiment of the present invention, the detecting means comprises means for converting light signals received by at least two pairs of photosensitive detectors into electrical signals, focus error signal applying means responsive to the electrical signals for applying a focus error signal to an optical means, and means responsive to the focus error signal for adjusting focusing of the optical means.

In accordance with still another preferred embodiment of the present invention, the optical means comprises collimating means for turning light from a light source into a parallel ray of light and converging lens means for converging the parallel ray of light from the collimating means on a recording media.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram showing one example of a structure of a conventional optical information reading apparatus;

DESCRIPTION OF THE PREFERRED EMBODIMENTS

Figure 2A:
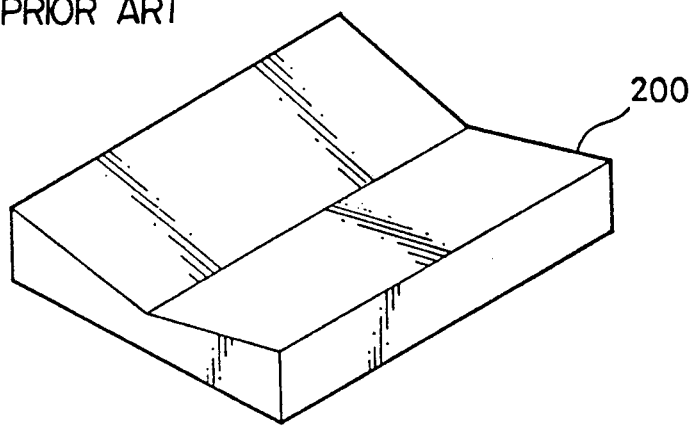
FIG. 2A and 2B are diagrams illustrating the principle of the wedge prism method.
Figure 2B:
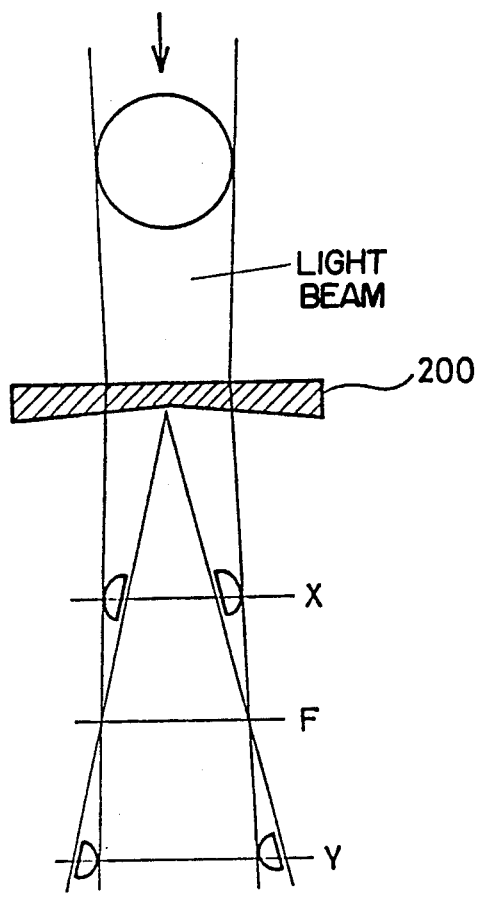
Figure 3:
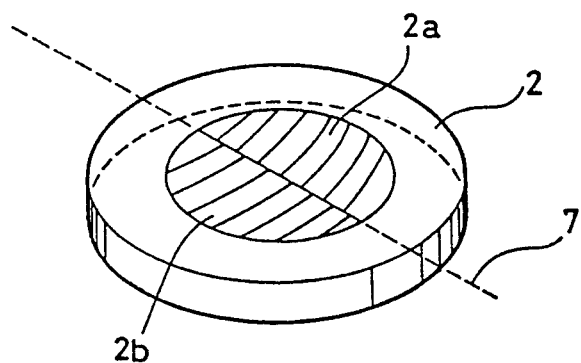
FIG. 3 is an enlarged view of a holographic grating 2 in a conventional example.
Figure 4:
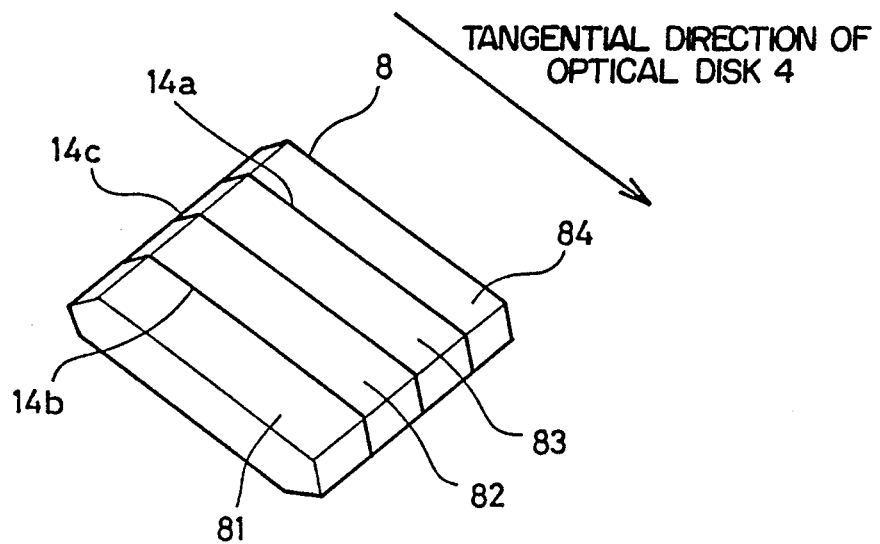
FIG. 4 is an enlarged view of a photosensitive detector 8 in a conventional example.
Figure 5A:
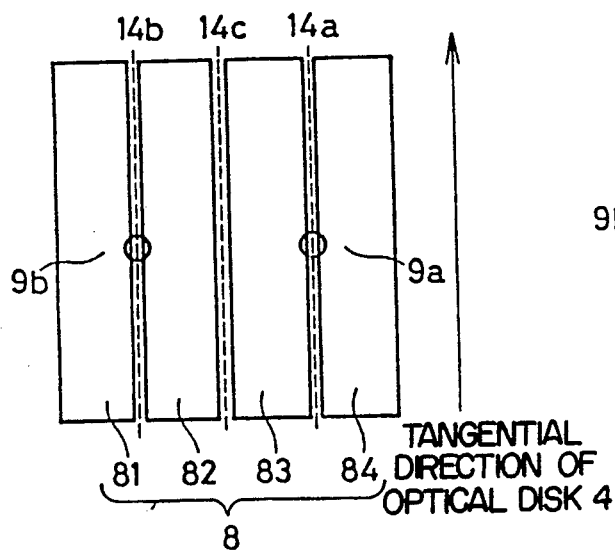
FIGS. 5A, 5B and 5C are diagrams showing the shapes and the positions of light spots formed on a photosensitive detector in a conventional optical information reading apparatus.
Figure 5B:
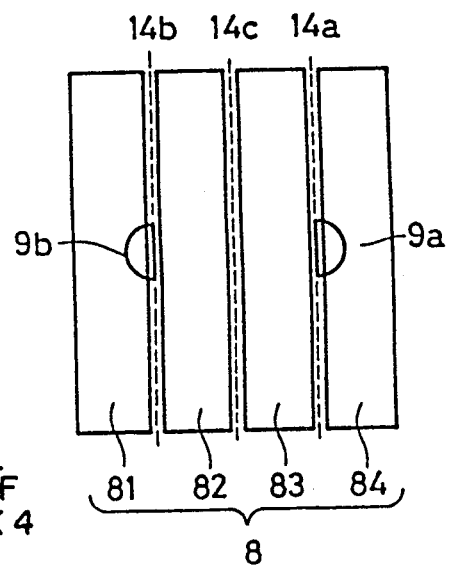
Figure 5C:
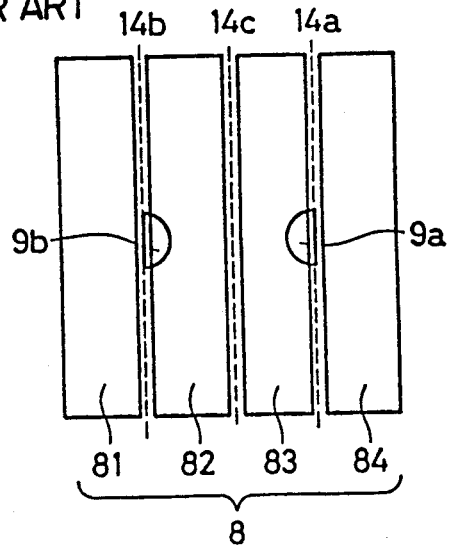
Figure 6:
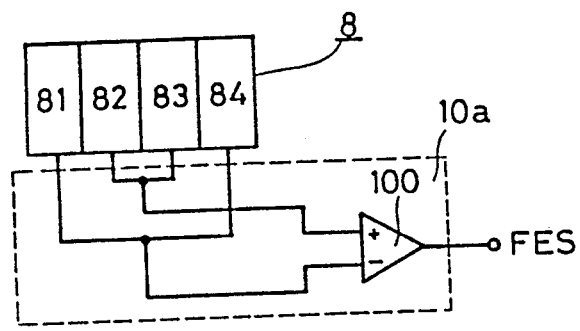
FIG. 6 is a diagram showing a method of forming an FES by a FES detecting portion in a conventional example.
Figure 7A:
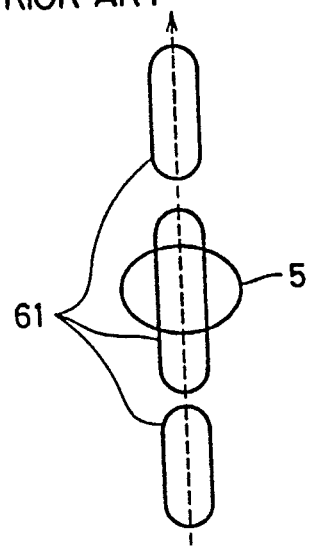
FIGS. 7A and 7B are respectively a diagram showing the positional relation between a light spot and pits formed on a disk in the in-focus state and a diagram showing the shapes and positions of light spots formed on a photosensitive detector when an astigmatic objective lens having is used in a conventional optical information reading apparatus.
Figure 7B:
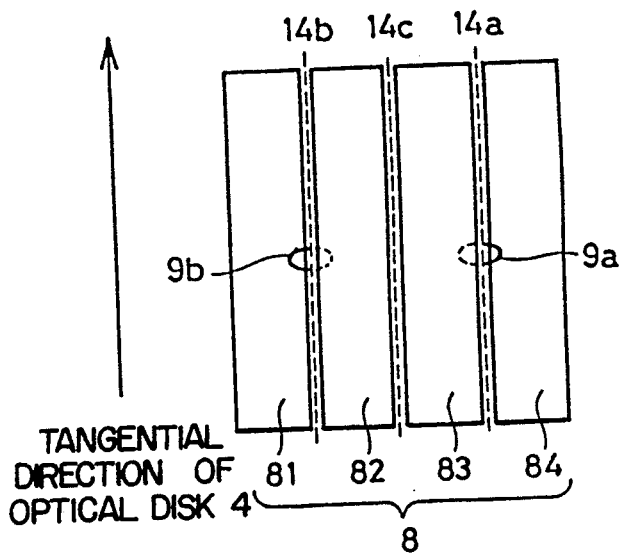
Figure 8:
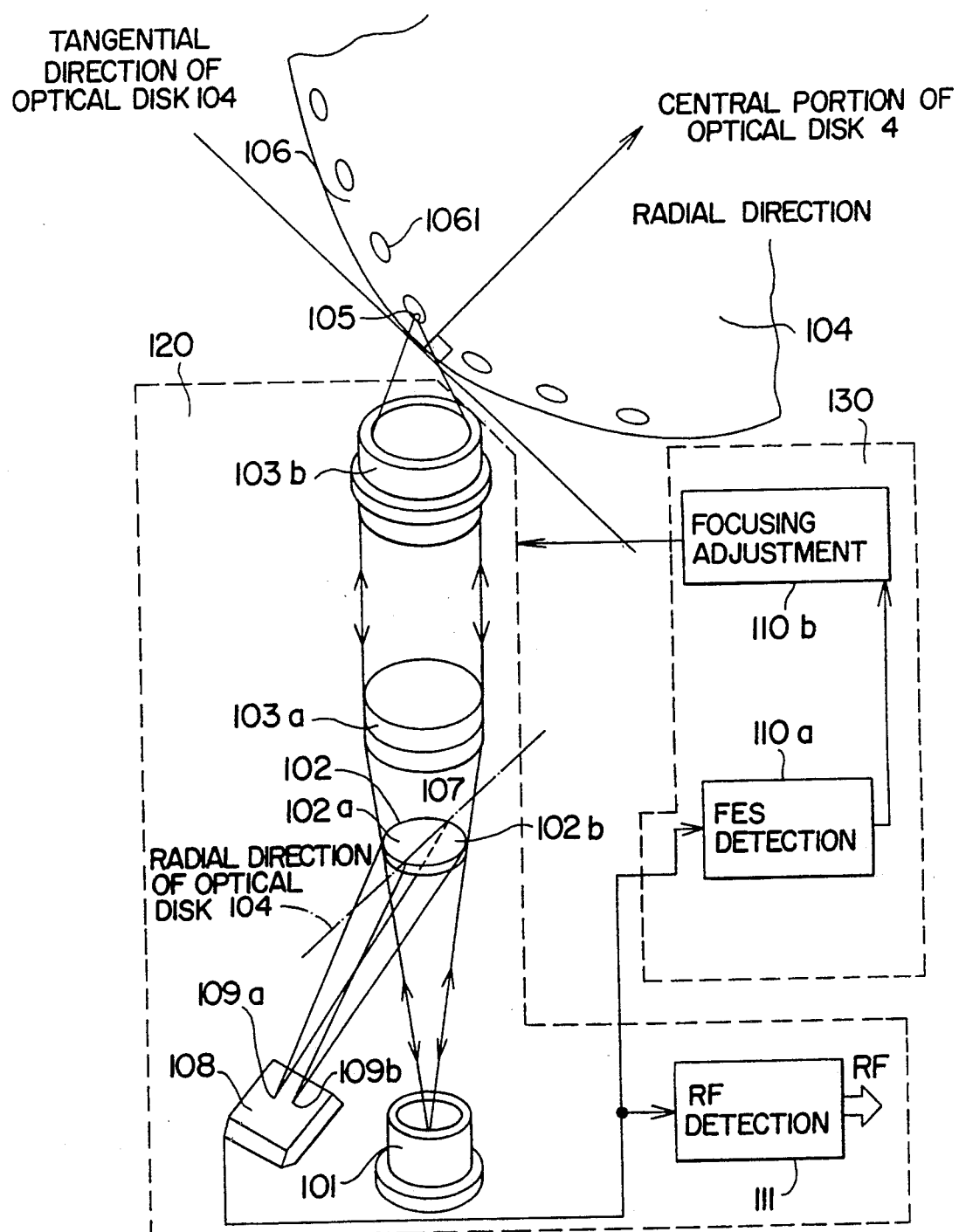
FIG. 8 is a schematic diagram showing the structure of an optical information reading apparatus according to an embodiment of the present invention.

FIG. 8 is a schematic diagram showing a structure of an optical information reading apparatus according to an embodiment of the present invention. Referring to FIG. 8, this apparatus comprises an optical disk 104, an optical system 120, and an RF detecting portion 111, and a servo system 130, as in the conventional example. The functions and structures of the RF detecting portion 111 and the servo system 130 are the save as those in the conventional example shown in FIG. 1. The optical system 120 comprises a source of laser source 101, a holographic grating 102 having the same structure as that in the conventional example (see FIG. 3), a collimating lens 103a, an objective lens 103b, and a photosensitive detector 108. The holographic grating 102 and the photosensitive detector 108 respectively having dividing lines, as in the conventional example. However, each of the dividing lines is vertical to a tangential direction of the disk 104, i.e., parallel to a radial direction of the disk 104, unlike the conventional example.

In FIG. 8, a laser beam emitted from the source of laser 102 is incident on the holographic grating 102. Only a zero-order diffracted beam out of the light beam incident on the holographic grating 2 is incident on the collimating lens 103a, as in the conventional example. The collimating lens 103a turns the incident light beam into parallel light beam, to direct the same to the objective lens 103b. The objective lens 103b converges the incident light beam, to form a light spot 105 on the surface of the optical disk 104 which is a rotating recording media. A pit train 106 comprising elliptical pits 1061 whose long axis are along a circumferential direction of the optical disk 104 is formed on the surface of the optical disk 104 facing the objective lens 103b. The light (light spot 105) converged on the optical disk 104 by the objective lens 103b is absorbed by the pits 1061 on the surface of the optical disk 104 while being reflected on a portion, where no pit is formed, of the surface of the optical disk 104.

The light reflected by the optical disk 104 is incident on the holographic grating 102 again through the same optical path. The holographic grating 102 includes two regions 102a and 102b divided by a dividing line 107 parallel to a radial direction of the optical disk 104. The directions of gratings and pitches between gratings in the two regions 102a and 102b respectively differ from each other. Thus, first-order diffracted beams of light incident on the holographic grating 102 which are diffracted by the regions 102a and 102b are respectively converged on different positions on the photosensitive detector 108, so that light spots 109a and 109b are formed on a light receiving surface of the photosensitive detector 108. More specifically, the first-order diffracted beam diffracted by the region 102a of the photographic grating 102 forms the light spot 109a, while the first-order diffracted beam diffracted by the region 102b thereof forms the light spot 109b.

Figure 9A:
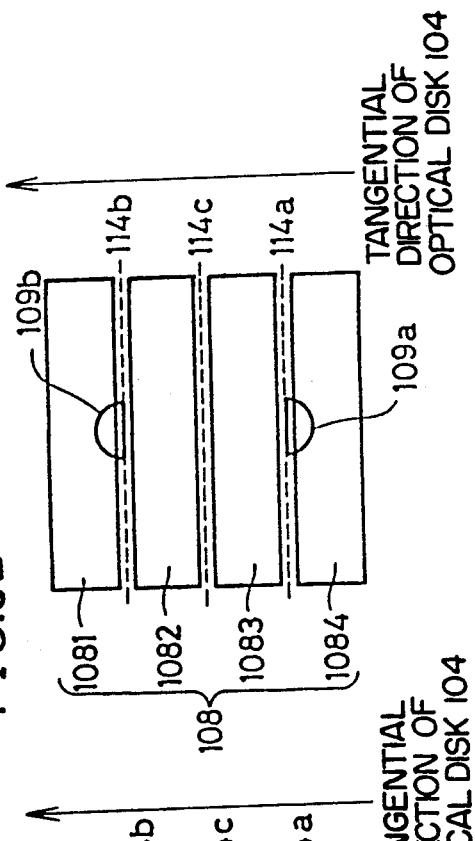
FIGS. 9A, 9B and 9C are diagrams showing the shapes and the positions of light spots formed on a photosensitive detector in the optical information reading apparatus according to the present invention.
Figure 9B:
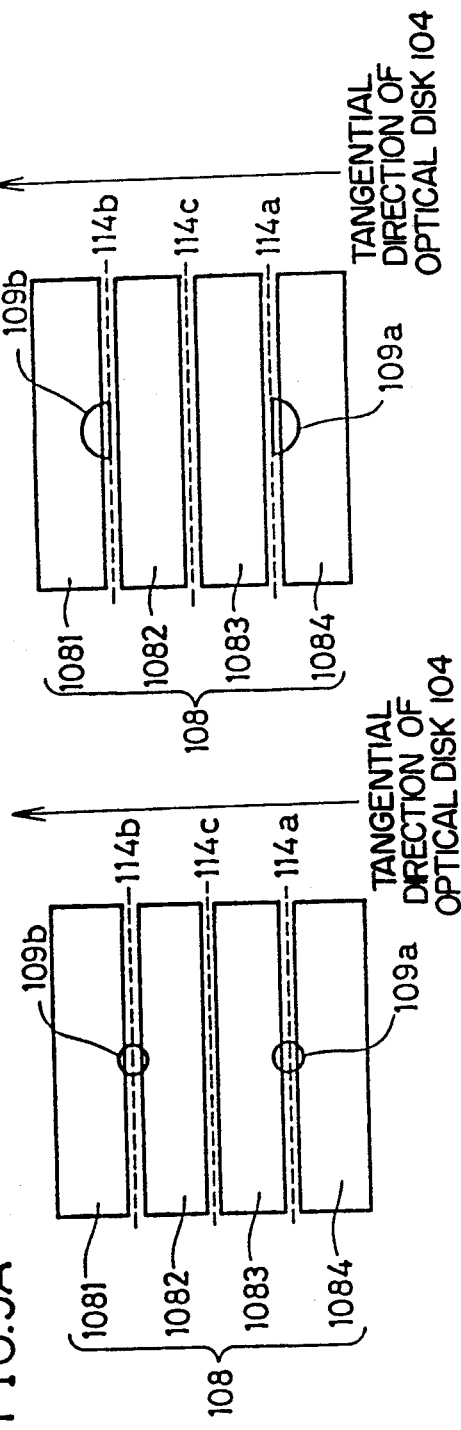
Figure 9C:
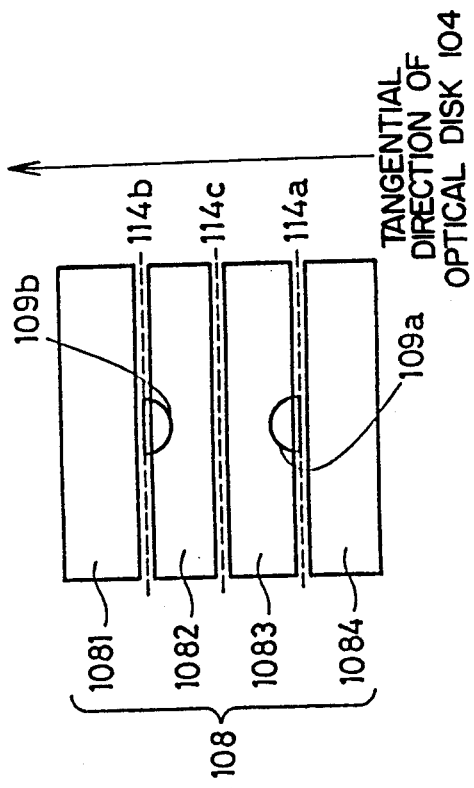

The photosensitive detector 108 comprises four photosensitive detectors divided by three parallel dividing lines which are parallel to a radial direction of the disk 104, i.e., parallel to the dividing line 107 of the holographic grating 102. FIGS. 9A to 9C are plan views showing a state in which images of the light spots 109a and 109b are formed in the in-focus state and the out-of-focus state, in addition to the structure of the photosensitive detector 108. Referring to FIGS. 9A to 9C, the photosensitive detector 108 comprises four photosensitive detectors 1081 to 1084 divided by dividing lines 114a, 114b and 114c. Since the dividing lines 114a, 114b and 114c are all parallel to a radial direction of the disk 4, all the directions thereof being at right angles to the direction of the long axis of the pits 1061 formed on the optical disk 104. FIG. 9A is a diagram showing the shapes and the positions of light spots 109a and 109b formed on the photosensitive detector 108 when the distance between the optical system 120 and the optical disk 104 is a predetermined distance, i.e., in the in-focus state. Referring to FIG. 9A, the light spots 109a and 109b are respectively formed in the form of dots between the photosensitive detectors 183 and 184 and between the photosensitive detector 1081 and 1082. FIG. 9B illustrates a state in which images of the light spots 109a and 109b are formed occur when the distance between the optical system 120 and the optical disk 104 is shorter than the predetermined distance. More specifically, the light spot 109a assumes an inverted semicircular shape expanded to the side of the photosensitive detector 1084 with respect to the dividing line 114a, while the light spot 109b assumes a semicircular shape expanded to the side of the photosensitive detector 1081 with respect to the diving line 114b. FIG. 9C illustrates a state in which images of the light spots 109a and 109b are formed when the distance between the optical system 120 and the optical disk 104 is longer than the predetermined distance. More specifically, the spot 109a assumes an inverted semicircular shape expanded to the side of the photosensitive detector 1083 with respect to the dividing line 114a, while the spot 109b assumes an inverted semicircular shape expanded to the side of the photosensitive detector 1082 with respect to the dividing line 114b.

As described above, the distance between the optical system 120 and the optical disk 104 is determined by the image formed state of the light spots 109a and 109b. Thus, an FES can be obtained by using the same approach as that in the conventional example. More specifically, it is assumed that the FES is a difference between the sum of outputs of the photosensitive detectors 1081 and 1084 and the sum of outputs of the photosensitive detectors 1082 and 1083. Referring to FIGS. 8 and 9A to 9C, an FES detecting portion 110 inputs to subtracting means (not shown) such as a differential amplifier the outputs of the photosensitive detectors 1082 and 1083 and provides an output of the differential amplifier as an FES. A focusing adjustment driving portion 110b displaces the position of the optical system 120 in response to the FES from the FES detecting portion 110a, to make adjustment such that the distance between the objective lens 103b and the optical disk 104 is always a predetermined value. The above described focusing servo will be specifically described. Assuming that the outputs of the photosensitive detectors 1081 to 1084 are respectively V1 to V4, the FES is represented by the following equation:

$$FES = (V1 + V4) - (V2 + V3)$$

Thus, when the objective lens 103b is excessively close to the optical disk 104 (see FIG. 9B), $$FES = 0$$

when the distance between the objective lens 103b and the optical disk 104 is a predetermined distance (see FIG. 9A).

$$FES = 0$$

and when the optical system 120 is spaced apart from the optical disk 104, $$FES < 0$$

The focusing adjustment driving portion 110b determines the level of the FES, to displace the optical system 120 to a direction moving further away from the optical disk 104 if the result of determination is positive, displace the optical system 120 to a direction moving nearer to the optical disk 104 if it is relative, and stop the optical disk 104 if it is relative, and stop the optical system 120 in the position thereof if it is zero. Thus, detection of the FES and positional displacement of the optical system 120 corresponding to the FES are repeated, so that the distance between the optical system 120 and the optical disk 104 is always held to a predetermined distance.

Then, the presence or absence of pits on the surface of the optical disk 104, which is reflected in the intensity of light reflected from the optical disk 104, can be determined by the output level of the photosensitive detector 108, as in the conventional example.

Thus, an RF signal corresponding to information recorded on the optical disk 104 can be obtained by the same approach as that in the conventional example. More specifically, the RF signal is represented by the following equation:

$$RF = V1 + V2 + V3 + V4$$

Thus, the RF detecting portion 111 adds signals obtained from the photosensitive detectors 1081 to 1084, to output the RF signal.

Figure 10:
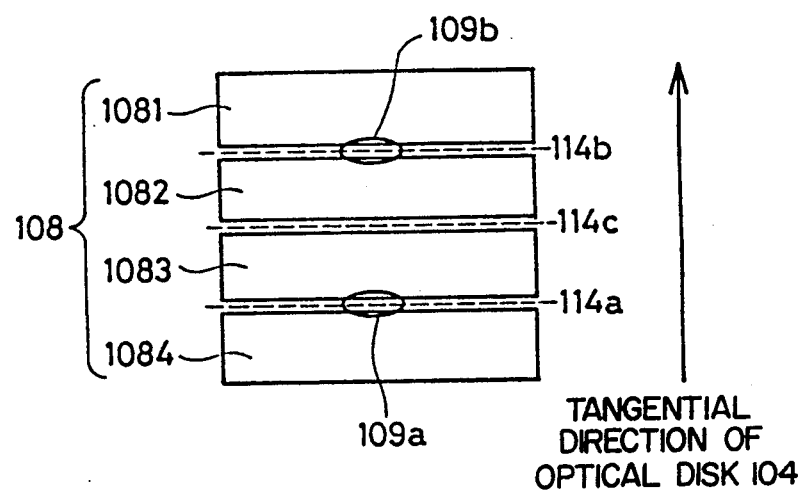
FIG. 10 is a diagram showing the shapes and the positions of light spots formed on a photosensitive detector in the in-focus state when an astigmatic objective lens is used in the optical information reading apparatus according to the present invention.

Description is now made of a case in which the objective lens 103b is made of plastic and thus, has astigmatism. In this case, the light spot 105 assumes an elliptical shape, as described above. In this case, for the same reason as that in the conventional example, the positional relation between the objective lens 103b and the optical disk 104 is selected such that the direction of the long axis of the elliptical light spot 105 is at right angles to the direction of the long axis of the pits 1061 formed on the optical disk 104. As a result, the RF signal obtained from the light spot 105 can be steeply changed depending on the presence or absence of pits. When the light spot 105 is elliptical, the spots 109a and 109b formed on the photosensitive detector 108 assumes a shape obtained by dividing an ellipse into two sections along its long axis, unlike the conventional example. This is because the direction of the long axis of the elliptical light spot 1061 is parallel to a radial direction of the optical disk 104 (vertical to a tangential direction of the optical disk 104) and the dividing line 107 of the holographic grating 102 is also parallel to the radial direction of the optical disk 104. Thus, the light spots 109a and 109b in a state departing from the in-focus state assumes shapes extending to the direction along the diving lines 114a and 114b, as compared with a case in which astigmatism is not developed in the objective lens 103b. It is the same in the in-focus state. FIG. 10 is a diagram showing the shapes and the positions of the light spots 109a and 109b in the in-focus state. Referring to FIG. 10, each of the light spots 109a and 109b becomes longer along the dividing lines 114a and 114b, and the shapes of the light spots 109a and 109b are not enlarged to a direction intersecting with the dividing lines 114a and 114b. Thus, even if the shapes of the light spots 109a and 109b are changed due to the astigmatism of the objective lens 103b, the FES can be made zero in the in-focus state. Thus, the conventional disadvantages are eliminated that the FES is generated irrespective of the in-focus state, whereby no good light spots are formed on the optical disk so that an incorrect RF signal is generated.

Although in the above described embodiment, spectral diffraction means for employing the wedge prism method includes a holographic grating, this spectral diffraction means is not limited to the holographic grating. For example, it is necessary to use spectral diffraction means having dividing lines for spectral diffraction.

Additionally, although means for generating an FES from an output of a photosensitive detector is not limited to a differential amplifier, it is necessary to use means for determining the shapes of light spots formed on the photosensitive detector and providing an electrical signal corresponding to each of the shapes.

As described in the foregoing, in the optical information reading apparatus according to the present invention, satisfactory focusing control can be performed using an astigmatic objective lens. Thus, excessively high precision is not required in forming the objective lens 103b. In addition, when astigmatism of the objective lens 103b is changed due to the change in environment such as the change in temperature, satisfactory focusing control can be also performed. Thus, the objective lens 103b can be formed by using a low cost method favorable to quantity production, such as injection molding using plastic material.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical information reading apparatus, comprising:
    a light source for producing a laser beam irradiating a rotating recording media provided with a pit train having a long axis along a circumferential direction;
    optical means for converging the laser beam from said light source on said rotating recording media;
    a diffraction grating member for emitting light converged in at least two directions upon receipt of light reflected by said rotating recording media, said diffraction grating member having first and second portions divided by a boundary line wherein said boundary line being aligned parallel to the radial direction of said rotating recording media; and
    detecting means comprising at least two pairs of photosensitive detectors respectively receiving said light emitted in at least two directions from said diffraction grating member for determining whether said optical means is properly positioned for focusing said light onto said recording media.
    each of said pairs of photosensitive detectors having a dividing line formed along the direction of the light emitted from said diffraction grating member.
    the direction in which each of said diffraction grating member faces said photosensitive detectors in said detecting means selected to be a direction parallel to the radial direction of said rotating recording media.

2. The optical information reading apparatus according to claim 1, wherein said detecting means further comprises means for converting light signals received by said at least two pairs of photosensitive detectors into electrical signals, focus error signal applying means responsive to said electrical signals for applying a focus error signal to said optical means, and means responsive to said focus error signal for adjusting focusing of said optical means.

3. The optical information reading apparatus according to claim 1, wherein said optical means comprises collimating means for turning the laser beam from said light source into a parallel ray of light, and converging lens means for converging the parallel ray of light from said collimating means on said rotating recording media.

* * * * *